*Inventor*
H. KANEKO
By Arthur M. Lieberman
Agent

Nov. 1, 1966 HISAISHI KANEKO 3,283,319

CODE CONVERTER

Filed Aug. 11, 1961 5 Sheets-Sheet 2

Inventor
H. KANEKO

By Arthur M. Lieberman
Agent

Nov. 1, 1966 HISASHI KANEKO 3,283,319

CODE CONVERTER

Filed Aug. 11, 1961 5 Sheets-Sheet 3

Inventor
H. KANEKO
By Arthur M. Lieberman
Agent

Nov. 1, 1966 HISASHI KANEKO 3,283,319

CODE CONVERTER

Filed Aug. 11, 1961 5 Sheets-Sheet 4

Inventor
H. KANEKO
By Arthur M. Lieberman
Agent

Nov. 1, 1966 HISASHI KANEKO 3,283,319

CODE CONVERTER

Filed Aug. 11, 1961 5 Sheets-Sheet 5

Inventor
H. KANEKO
By Arthur M. Lieberman
Agent

United States Patent Office 3,283,319
Patented Nov. 1, 1966

3,283,319
CODE CONVERTER

Hisashi Kaneko, Tokyo, Japan, assignor to Nippon Electric Company, Limited, Tokyo, Japan, a corporation of Japan Filed Aug. 11, 1961, Ser. No. 130,894
Claims priority, application Japan, Aug. 25, 1960, 35/36,168
7 Claims. (Cl. 340—347)

This invention relates to signal conversion by quantization in which a continuous signal is quantized and converted into a digital signal. Although this invention is applicable to both linear and nonlinear quantization, it is believed that it will find particularly advantageous applications in nonlinear converters. Therefore, the specification hereinbelow will be directed to a discussion of the more complex nonlinear converters.

It is well known that when a continuous analog signal, such as voice or television, is converted into a digital signal by way of quantizing, sampling and coding, salient technical merits such as the elimination of noise in the processing of information can be obtained.

In conventional methods analog signals have been quantized at equal intervals, however, when the probability of the distribution of small amplitude portions of the signal is great, it is desirable to more closely quantize such portions. This has generally been achieved by linear quantization after the analog signal has been expanded or compressed by an instantaneous compress-expander employing a semiconductor element (or vacuum tube). In the conventional methods, however, since the nonlinear quantizing characteristic depends upon a certain nonlinearity of a semiconductor element (or a vacuum tube) which is particularly affected by ambient characteristics, the conversion characteristic is liable to vary negating any uniformity.

In order to nonlinearly quantize an analog signal to obtain N discrete signal levels, N power sources (or amplifiers, attenuators, etc.) and switching circuits corresponding to the sources are required. For instance, the circuit of FIG. 19 of Mr. D. R. Brown's paper disclosed in IRE February 1949 (p. 144) can be used by selecting the voltages $e_1$–$e_8$ corresponding to the nonlinearly quantized voltages, to obtain a nonlinear coder. However, the necessary number of each element $N=2^n$ increases sharply when the number of digits $n$ increases (for example, 1024 elements will be required at 10 digits), and it is therefore not economically feasible to realize such a coder. On the other hand, if the number of the elements is decreased, the degree of freedom is deteriorated since the nonlinear function of the nonlinear quantization is fixed. For instance, in a feedback type coder, by nonlinearly quantizing the analog signals by means of a network comprising $2n$ resistors and a group of switches, a nonlinear characteristic showing a part of a hyperbolic can be obtained (as described in Mr. B. D. Smith's paper disclosed in IRE August issue, 1953). Nevertheless the nonlinear logarithmic compression characteristics are of utmost practical importance, since the signal-to-noise ratio is not affected by the signal level.

An object of this invention is to provide nonlinear quantization having logarithmic compression-expander characteristics by using as small number of circuit elements as possible and without depending upon inherent nonlinear characteristics of semiconductors, etc.

Another object of this invention is to reproduce the analog signal from a digital signal, which is logarithmically compressed by the coding method mentioned above by a nonlinear decoder having logarithmic expansion characteristics, at the destination of the signal.

According to the present invention a coding system for a continuous signal is provided wherein the continuous signal is nonlinearly coded into an $m$ base $n$ digit code, the code in turn being decoded into a nonlinearly quantized signal by controlling the gain of amplifiers included in the system in response to each digit and code.

The principle of this invention will now be explained hereunder. The following assumptions are made: a certain region of an analog signal is quantized to $m^n$ discrete values, by an $n$-digit $m$-base code; $k$ stands for the number of digits beginning from the most significant digit $(k=1,2, \ldots n)$; $i$ stands for the number of quantizing levels in a certain digit, $x_k(i)$ is an analog quantity corresponding to the number of quantizing levels $k$ digits; and the following equation is satisfied.

$$\Delta x_k(i)=x_k(i+1)-x_k(i) \qquad (1)$$

One method of decreasing the number of circuit elements is to make a certain number of a group of quantized levels of every group of quantized levels analogous; namely the following equation is satisfied.

$$\frac{\Delta x_k(i+1)}{\Delta x_k(i)}=\alpha_k \qquad (2)$$

where $\alpha_k$ is a constant.

This equation stands for the fact that an analog signal is nonlinearly quantized in such a manner that the ratio of the difference of neighboring quantized levels is kept constant.

This nonliner characteristic can be obtained by solving the constant coefficient difference Equation 2 employing the boundary condition of quantizations $x_1(0)=0$, $x_1(m^n)=E_0$, $x_k(i)$ is obtained as follows:

$$x_k(i)=A\cdot(\alpha_k^i-1) \qquad (3)$$

$$\text{where}\begin{cases} i=0,\ 1,\ \ldots\ N_{k-1} \\ A=\dfrac{E_0}{\alpha_k^{N_{k-1}}-1}=\dfrac{E_0}{\alpha_1^{m^n}-1} & (4) \\ \alpha_k=\alpha_1 m^{k-1} & (5) \\ N_k=m^{n-k+1} & (6) \end{cases}$$

$$\Delta x_k(i)=A\cdot\alpha_k^1(\alpha_k-1) \qquad (7)$$

In Equations 3–7, $\Delta x_k(i)$ is a quantization unit in $k$, and $x_k(i)$ is an analog value corresponding to the $i^{th}$ quantizing level in $k$.

The case where $k=1$ is that case where the most subdivided quantization is performed in the lowest digit and this characteristic shows the nonlinear characteristic of the quantization, where following equation is satisfied.

$$x_1(i)=\frac{E_0}{\alpha_1^{m^n}-1}(\alpha_1^i-1) \qquad (8)$$

In this case, the analog quantity $x_1(i)$ is expressed by an exponential function against quantization level $i$, and, on the contrary, $i$ shows the logarithmic compression characteristic in relation to $x_1(i)$.

This shows the logarithmic compression characteristic as shown by the Equation 9, where $$\alpha_1=(1+\mu)\ \frac{1}{N_1}$$

$$\frac{i}{N}=\frac{\log\left[1+\mu\frac{x_1}{E_0}\right]}{\log\ (1+\mu)} \qquad (9)$$

which is the so-called $\mu$ characteristic (B. Smith, B.S.T.J., May issue, 1957).

From the above, it will be understood that the number of the circuit elements can be decreased at the expense of the degree of freedom, by selecting the quantizing unit $\Delta x_k(i)$ in such a manner that it forms a geometric series.

Now, if the quantizing process advanced at the $$i=(j+q)^{\text{th}}$$

quantizing domain in the $(k+1)$ digit, this domain will exist at the region between $x_{k+1}(j+q)-x_{k+1}(j+q+1)$. At the $k^{\text{th}}$ digit, when this region is subdivided into $m$ portions, comparing the difference between the value of $r^{\text{th}}$ portion $x_k\{(j+q)m+r\}$ and $x_k\{(j+q)m\}$ with the difference between the values of $x_{k+1}(j+q)$ and $x_{k+1}(j)$, the following equations will be obtained:

$$G_k(q, r)=\frac{x_{k+1}(j+q)-x_{k+1}(j)}{x_k\{(j+q)m+r\}-x_k\{(j+q)m\}} \quad (10)$$

$$=\frac{x_k\{(j+q)m\}-x_k(jm)}{x_k\{(j+q)m+r\}-x_k\{(j+q)m\}}$$

$$=\frac{\alpha_k^{(j+q)m}-\alpha_k^{jm}}{\alpha_k(j+q)m+r-\alpha_k(j+q)m}$$

$$=\frac{\alpha_k^{qm}-1}{\alpha_k^{qm}}\cdot\frac{i}{\alpha_k^{r}-1} \quad (11)$$

$$=G_k'(q)\cdot G_k''(r) \quad (12)$$

where $$G_k'(q)=\frac{\alpha_k^{qm}-1}{\alpha_k^{qm}}=\frac{\alpha_1^{qm}k-1}{\alpha_1^{qm^k}} \quad (13)$$

$$G_k''(r)=\frac{1}{\alpha_k^{r}-1}=\frac{1}{\alpha_1^{rmk-1}-1} \quad (14)$$

and $k=\{1, 2, \ldots n-1\}$
$q=\{1, 2, \ldots n-1\}$
$r=\{1, 2, \ldots n-1\}$

When $q=0$, however, if $G_k(q, r)$ is defined as follows, $$G_k(0)=\frac{x_{k+1}(j+1)-x_{k+1}(j)}{x_k(jm+r)-x_k(jm)} \quad (15)$$

then $$G_k(0)=\frac{\alpha_k^{m}-1}{\alpha_k^{r}-1}=\frac{\alpha_1^{m^k}-1}{\alpha_1^{rm^{k-1}}-1}-1 \quad (16)$$

$G_k(q, r)$, obtained by the Equations 11 and 16, is the ratio of the quantizing amplitude corresponding to the code of digit $q$ of some $(k+1)^{\text{th}}$ digits in an $m$ base $n$ digit coding system, to the quantizing amplitude corresponding to the code of digit $r$. In the process of quantizing, these values are coded with reference to a voltage $e_0$, therefore, $G_k(q, r)$ shows the amplification required to enable the comparison of each digit and level with a reference voltage $e_0$.

And in the above, since the amplitude between each digit is obtained at the maximum digit $k=n$, a group of amplifiers is necessary so that the amplitude discriminating level given by $x_n(i)$ may correspond to the reference voltage $e_0$. Therefore, the gain of the group of amplifiers will be as follows:

$$G_o(r)=\frac{e_0}{x_n(r)}=\frac{e_0}{E_0}\cdot\frac{\alpha_1^{m^n}-1}{\alpha_1^{rm^{n-1}}-1} \quad (17)$$

where, $r=1, 2 \ldots m-1$.
where $m=2$, i.e. binary, $r=1$, $q=0$, 1, therefore, the Expressions (11), (16), (17) will be simplified as follows:

$$G_k(q, r=1)\begin{pmatrix} =\alpha_k+1 & \text{when } q=0 \\ =\dfrac{\alpha_k+1}{\alpha_{k+1}} & \text{when } q=1 \end{pmatrix} \quad (18)$$

$$G_0(r=1)=\frac{e_0}{E}(\alpha_n+1)=\text{constant} \quad (19)$$

where $\alpha_k=\alpha^{2k-1}$

It will be understood from the above that, according to the system of this invention, the whole necessary number of the amplification $G_k(q, r)$ is $(2m-1)$ for some digit. Furthermore, with $e_0$ suitably chosen, the number is $2(m-1)$, therefore, the necessary number of $G_k$ will be $2(m-1)\times(n-1)$ for the $(n-1)$ digit. On the other hand, the necessary number of $G_0(r)$ will be $(m-1)$. According to the conventional systems, $m^n$ elements are used, and therefore, the number of the elements will be greater than the present invention where the number of elements is proportional to $(n-1)$.

The above-mentioned and other features and objects of this invention and the manner of attaining them will become more apparent and the invention itself will best be understood by reference to the following description of an embodiment of the invention taken in conjunction with the accompanying drawings wherein.

Figure 1:
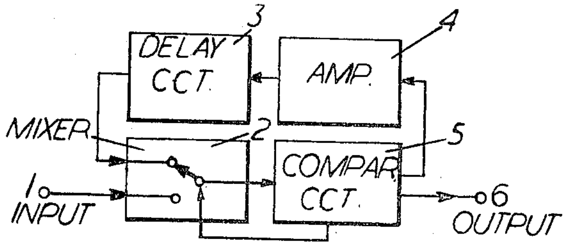
FIG. 1 illustrates schematically a conventional linear quantizing coder.

FIG. 1 shows a conventional comparison type binary coder by the pulse feedback method which performs a linear quantizing. In this coder, an amplitude modulated analog signal (PAM signal) is applied to the input terminal 1. Mixer 2 comprises an adder composed of switching circuits and resistors, or an "OR" circuit employing a semiconductor element or vacuum tube, etc., which passes the input PAM signal at the most significant digit and the feedback digits from the delay line circuit 3. When an adder or an "OR" circuit is used, it is necessary that the pulse width of PAM signal applied to the input terminal 1 is equal to the pulse interval of a clock frequency or preferably slightly narrower. Delay circuit 3 is composed of a well-known concentrated constant delay circuit or a distributed constant delay line which causes a delay having an interval of the clock pulse. The loop gain of amplifier 4 is 2. 5 is a comparison circuit, the construction of which is as shown in FIG. 2.

Figure 2:
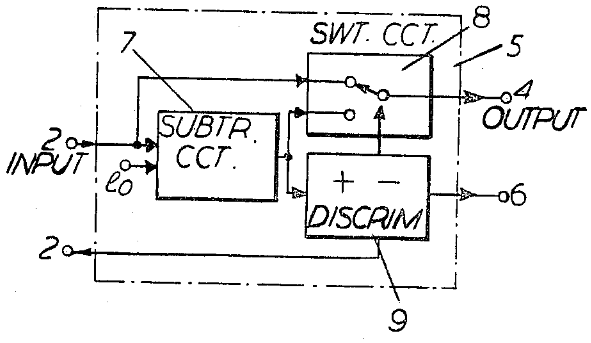
FIG. 2 shows the coding circuit employed in the coder of FIG. 1.

In FIG. 2, the subtraction circuit 7, in which the reference voltage $e_0$ is subtracted from a signal voltage applied from the mixer 2, comprises a resistor network circuit and differential amplifier. The gain of the circuit 7 is unity. Switching circuit 8 comprises mechanical or electronic switches controlled by the control signal from a circuit 9, which is a positive-negative discriminator circuit (i.e., the well-known Schmidt circuit or multiplier circuit disclosed in "The Recent Pulse Techniques" p. 152, published by the Institute of Electrical Communication Engineers of Japan, 1957). The circuit 9 operates in such a manner that it is a positive-negative discriminator in case the operating level is zero and generates a pulse in case the output of the circuit is positive. The switching circuit 8 is controlled so that it may transmit the signal from the circuit 7 to the amplifier 4.

The coding process by the circuits of FIGS. 1 and 2 will be explained hereunder. A PAM signal applied to the input terminal 1 is supplied to the coder 5 at the first digit $(k=n)$ via mixer 2. In the coder 5, the supplied signal is compared with the reference voltage $e_0$, whereby a pulse is generated by the circuit 9 in case the signal is greater than the voltage $e_0$, and the output signal minus the voltage $e_0$ is applied to the amplifier 4 via circuit 8. On the other hand, when the output signal of the mixer 2 is smaller than the voltage $e_0$, the signal is passed through the circuit 8 as it is. The on-off states of pulses generated at the circuit 9 is the coded output signal, which may be derived from the output terminal 6. The output signal of the switching circuit 8 is doubled at amplifier 4, and is delayed by one clock pulse interval at the delay circuit 3 so as to be applied to the mixer 2 at the time position of next digit ($k=n-1$) and the above operation is repeated. And when the operation is repeated serially until $k$ becomes 1, a binary linear coding of $n$ digits is completed. At the next sampling period, the same operation is repeated again, the input PAM signal being ultimately converted into a PCM signal.

The signal coding system by non-linearly quantizing, according to this invention, nonlinearly quantizes and logarithmically compresses and expands analog signals, with as few elements as possible, in accordance with the above-mentioned principle by, in effect, changing the gain of the amplifier 4 to the values obtained by the expressions (11), (16) and (17). An embodiment and an application thereof according to the invention and based on an $m$ modulus $n$ digit code will now be explained hereunder, with reference to FIGS. 3–8.

Figure 3:
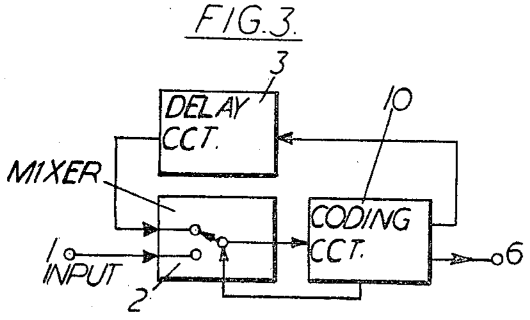
FIG. 3 is a schematic diagram showing a practical application of an embodiment of this invention.
Figure 4:
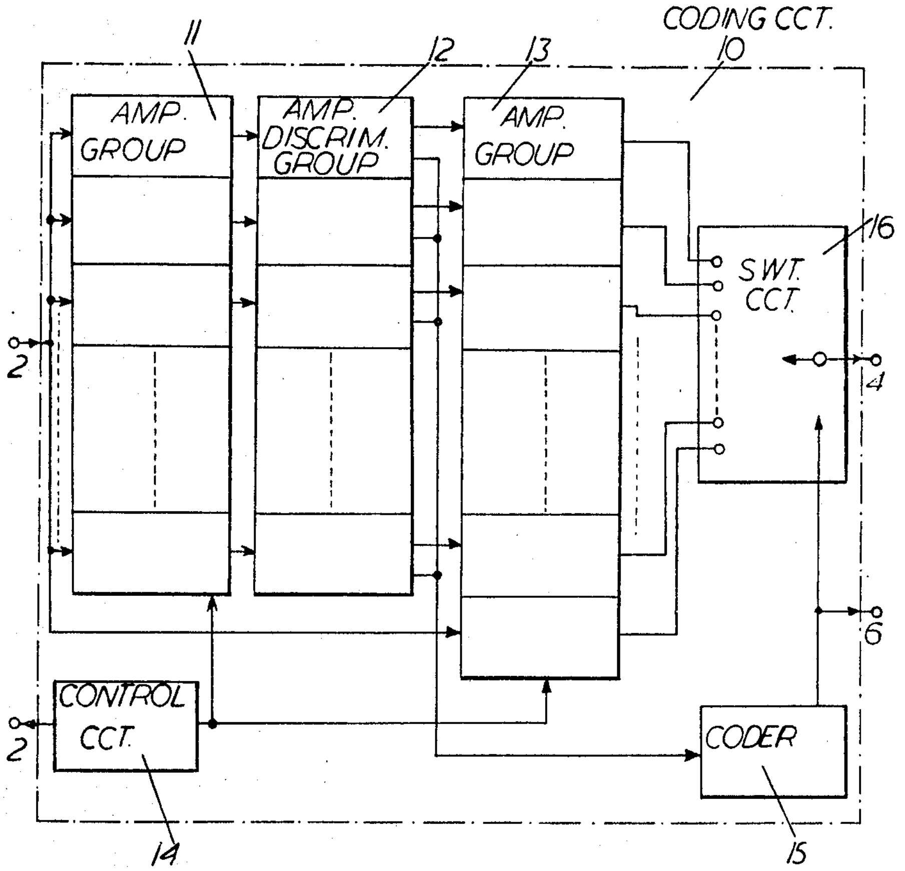
FIG. 4 illustrates in greater detail an embodiment of this invention.
Figure 5:
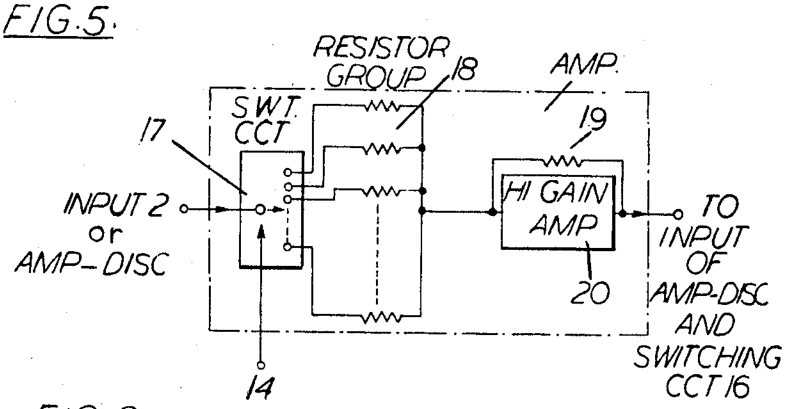
FIG. 5 illustrates an amplifier shown in block form in FIG. 4.
Figure 6:
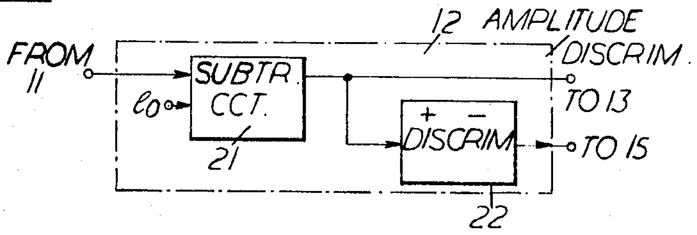
FIG. 6 illustrates an amplitude discriminator shown in block form in FIG. 4.

The coding circuit 10 of FIG. 3 is shown in detail in FIG. 4. Reference 11 in FIG. 4 shows a group of $(m-1)$ amplifiers corresponding to $r=1$ through $r=m-1$; an example of an individual amplifier being shown in FIG. 5. Amplifier 11 comprises a switching circuit 17 having $n$ circuits, $n$ resistors 18, resistor 19 and a high gain amplifier 20, constructing the so-called feedback circuit, the gain of which is given by the ratio of the active resistors 18 to resistor 19. The gain is therefore made variable by switching the group of resistors 18 by means of switching circuit 17. Switching circuit 17 is operated step by step in response to the digits $k=n, n-1 \ldots 2, 1$ of the control signal applied through 14. Now, considering the $r^{th}$ amplifier in a group of $(m-1)$ amplifiers, the overall gain of the amplifier group 11 is equal to $G_0(r)$ given by the expression (17) when the position of the switch $k=n$, while it is equal to $G_k''(r)$ given by the expression (14) when the position of the switch is equal to $k=n-1 \ldots 2, 1$. Reference 12 indicates a group of $(m-1)$ amplitude discriminators having equal characteristics; the individual construction of 12 is shown in FIG. 6. In the well-known subtraction circuit 21, comprising the above-mentioned differential amplifier etc., the reference voltage $e_0$ is subtracted from the input signal voltage. The output of the circuit 21 is applied to an amplifier of the amplifier group 13 of the next stage, and to the output terminal 15 via the positive-negative discrimination circuit 22 which is similar to the circuit 9 of FIG. 2. Accordingly, in the discriminator 12, the input signal is compared with the reference voltage $e_0$, with the result that a code signal is obtained at the output terminal 22. Amplifier group 13 is composed of $m$ amplifiers $(m-1)$ amplifiers of which are connected to a corresponding discriminator of the amplitude discriminator group 12, and one amplifier of which is connected to the mixer 2. The gains of $(m-1)$ amplifiers corresponding to $q=1$ to $(m-1)$ are given by $G_k'(q)$ of the expression (13), while that of the remaining one corresponding to $q=0$ is given by the expression (16). The construction of the amplifier group 13 is the same as the above-mentioned amplifier 11 shown in FIG. 5. Switch 17 is operated step by step in response to the digit $k$, as in the case of the circuit 11, but the condition of stepping is different to some extent. Namely, switch 17 comprises $n$ contacts which are arranged in such a manner that at the $k^{th}$ digit, the gain is $G'_{k-1}(q)$, $G_{k-1}(0)$, and at the 1st digit, the gain is zero. In other words, the value of the resistance of the first digit of resistance group 18 of the amplifier group 13 shown in FIG. 5 is arranged to be infinite.

Figure 7:
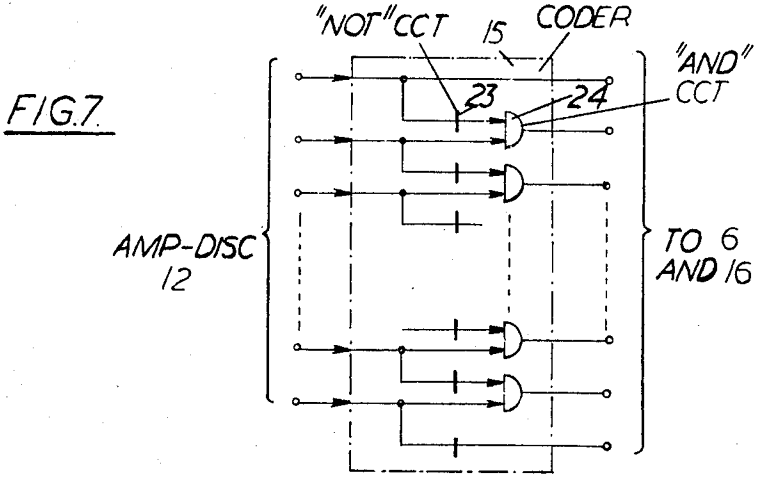
FIG. 7 illustrates the coder shown in block form in FIG. 4.
Figure 8:
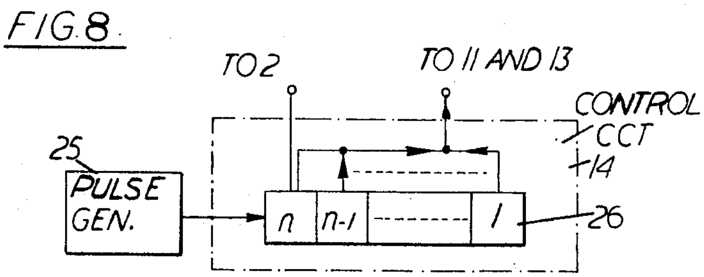
FIG. 8 illustrates the control circuit shown in block form in FIG. 4.

Switching circuit 16 in FIG. 4 is controlled by the signal from $m$-base coder 15, and transmits an output of the $m$ amplifier group. An example of $m$-base coder 15 is shown in FIG. 7. The output signal from the $(m-1)$ amplitude discriminators 12 are applied to the input terminal of the coder 15 in the order beginning at the most significant digit, from an amplitude discriminating circuit for discrimination of large values. References 23 and 24 are well-known "NOT" (logical inhibition) elements, and "AND" (logical multiplication) elements respectively. The former is composed of a polarity inverter comprising a transistor, vacuum tube, or transformer, while the latter is composed of a logical multiplier comprising a diode, transistor, or vacuum tube, etc. The group of the amplitude discriminators discriminates the analog signal voltage corresponding to $x_k(i)$. When the level of an input signal between $x_k(i)$ and $x_k(i_0+1)$ all of the output signals of the amplitude discriminators are unity in the case where $i \leq i_0$ and all of them are zero where $i > i_0$. Therefore, by means of the $m$-base coder 15, the output code 1 appears only when the output terminal 15 is the $i_0$th and all of the other output codes are 0, namely, a coded signal on $m$-base is obtained. This output signal is applied to the output terminal and to switching circuit 16 (FIG. 4) at the same time, in order to selectively control the output of the amplifier in the amplifier group 13. Control circuit 14 which controls the switch 17 of amplifier groups 11 and 13 is shown in FIG. 8. 26 is a well-known $n$-stage ring-counter, comprising, for example, $n$ bistable multivibrators connected in tandem. The ring counter 26 is operated step by step in response to clock pulses from pulse generator 25 which generates pulses in the order of $n^{th}$, $(n-1)$th . . . 1st digits, to close the switches of the amplifier groups 11 and 13. Only the output of the $n^{th}$ digit controls the mixer 2, in order to transmit the input PAM signal to the coding circuit 10 at the first $n^{th}$ digit. Delay circuit 3 is similar to that mentioned previously in connection with FIG. 1.

The above description, explaining a practical application of the embodiment of this invention shown in FIG. 3, is similar in operation to the conventional system shown in FIG. 1. When an analog signal to be coded is applied to the input terminal 1 as PAM pulses, the signal is applied to each of the amplitude discriminators of the group 12 via mixer 2 and amplifier group 11, whereby the signal is coded by discriminating the input signal with reference to the level of $x_n(r)$. Only when the reference voltage value proportional to $x_n(r)$ is subtracted from the input value, the voltage is amplified by the amplifier group 13, and is delayed by one pulse interval by the delay circuit 3. The delayed pulse is applied to the mixer 2 again, and a similar operation is repeated. When this operation has been repeated $n$ times, the quantization of $n$ digits is completed. When the gain of the amplifier groups 11 and 13 are chosen according to the expressions (11), (16), and (17), respectively, an $m$ base $n$ digit coding, having logarithmic compress-expanding characteristics as indicated in formula (8), is made, as will be understood from the above description.

Figure 9:
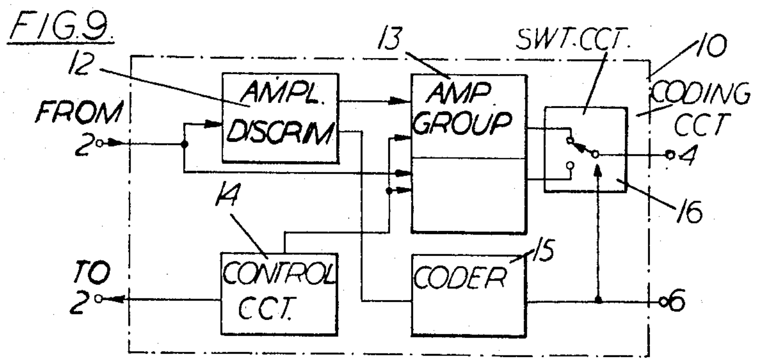
FIG. 9 illustrates the circuitry for the case of binary $n$ digit coding.

In the case of binary $n$ digit coding, the circuit is very simple. In such a case, coding circuit 10 in FIG. 3 will be constructed as shown in FIG. 9. Only one amplitude discriminator 12 is required, and moreover, the amplifier group 11 can be omitted by suitably setting the reference voltage $e_0$. The gain of the amplifier group 13 is given according to the expression (18). The gain of the amplifier is switched $2(m-1)=2(n-1)$ steps. Even if 7 digit coding is made, only 14 steps of gain switching is required. This number of gain switching is easily constructed and simple compared with the case where the coding is made on the basis of $m^n=128$ elements.

Figure 10:
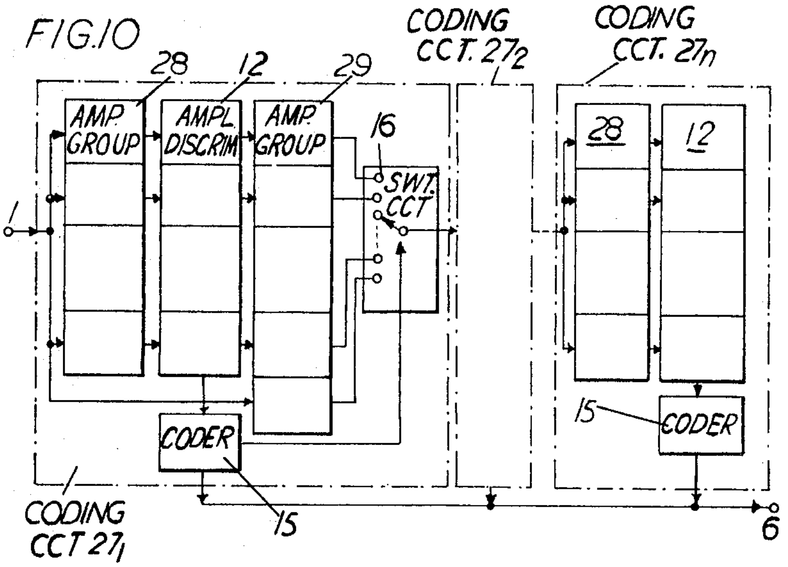
FIG. 10 shows another practical application of an embodiment of this invention, wherein a tandem arrangement is employed for coding of the digits.

The above explanation is made with reference to the case where the pulses are circulated by $n$ digits by means of a delay circuit, however, a circuit arrangement comprising similar circuits $27n$, $27n-1$ . . . $27_1$ connected in tandem, may be employed, as shown in FIG. 10. In this case, although the number of circuits become greater the system has the special advantage of coding all $n$ digits instantly. In this case, moreover, the amplifier groups 11 and 13 have no switch 17, and the number of the resistors 18 is only one. ($n$–1) coder $27_{n-1}$ to $27_1$ have equal characteristics and different gains, while the amplifier group is not required because further subdivision is not necessary in the least significant digit.

FIG. 4, the circuit 10 employs the amplifier group 11 having ($m$–1) amplifiers, the amplitude discriminator group 12 having ($m$–1) amplitude discriminators and the amplifier group 13 having $m$ amplifiers, connected in parallel; however, this circuit may be constructed by one of the amplifier groups 11 and 13 and the discriminator 12, by introducing a time division system. Namely, the gain $G''_k(q)$ of the circuit 13 can be controlled by the code $q$ obtained in the case where the output code of the circuit 12 varies from 1 to 0, by way of changing the gain of the amplifiers according to $G'_k(r)$ in the expression (14) in the order of $r=1, 2 \ldots (m-1)$. In this case, the time control is applied with the $m$ base coding repetition in a manner similar to that of the circuit 14.

Figure 11:
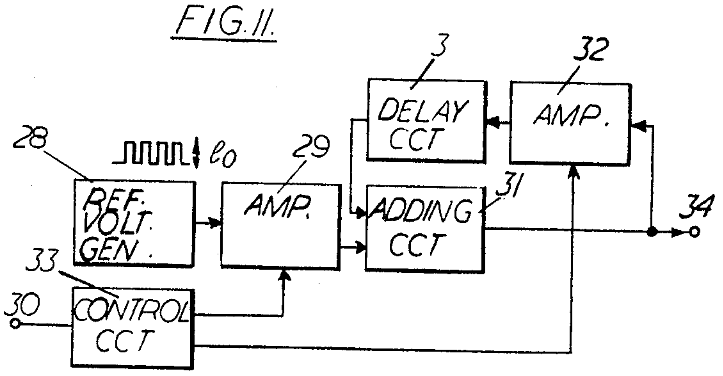
FIG. 11 shows a decoder for the signal coded by the circuit of FIG. 3.
Figure 12:
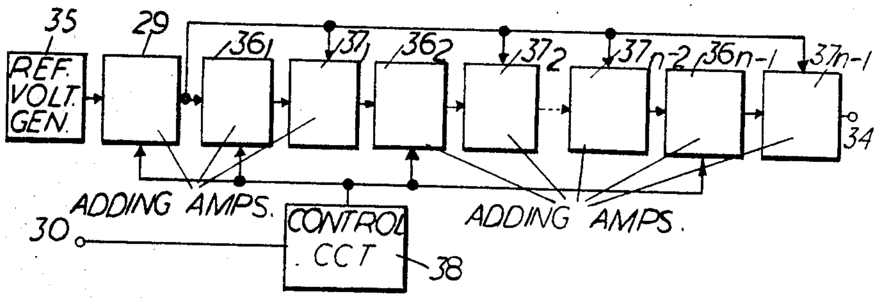
FIG. 12 shows a decoder employing parallel decoding.

The above description referred to a nonlinear coder having logarithmic compress-expanding characteristic, while the following description will refer to an example of a decoder for the coded $m$-base $n$ digit signal with reference to FIGS. 11 and 12. The decoder shown in FIG. 11 or FIG. 12 is a decoder for decoding the coded signal coded by the coder shown in FIG. 3. 30 is the input terminal for the $m$ base $n$ digit signal. By means of a control circuit 33, the code $r_n$ of the $n^{th}$ digit causes the gain of an amplifier 29 to vary, while the codes $r_{n-1}$–$r_1$ of the ($n$–1)th digit to the 1st digit are switched. 31 is a well-known adding circuit, while 3 is the previously mentioned delay circuit. Now, supposing that the received code signal series of $m$-base $n$ digits is $r_n, r_{n-1} \ldots r_1$, then the number of the quantizing level $i$ is given by the expression (20).

$$i=\sum_{j=1}^{n} r_j m^{j-1} \tag{20}$$

The gain of amplifier 29 is variable having a similar construction to that of FIG. 5. The value of the gain is equal to $1/G_0(rn)$ which is the inverse of the value obtained by the expression (17). And the gain of amplifier 32 is equal to $1/G_k(r_{k+1}, r_k)$ in regard to $k$, $r=r_k$, $q=r_{k+1}$. In such a case, the output pulse of the pulse generator 28, which generates the reference voltage value $e_0$ periodically by clock pulses, is applied to the amplifier 29 controlled by code $\{r_n\}$, adding circuit 31, amplifier 32, and then delay circuit 3. At the adding circuit 31, the output pulse of the delay circuit 3, and the pulse from the amplifier 29 are added. The cylic process is repeated for ($n$–1) times regarding each of $k=1, 2 \ldots n-1$ digit. Then at the output terminal 34, the added value of this cyclic pulse is obtained forming the decoded output FIG. 11 shows an embodiment wherein decoding is made serially with reference to each digit. As coding can be made in parallel (as in FIG. 10), similarly, the decoding can be made in parallel with reference to each digit, the embodiment of which is shown in FIG. 12. Voltage generator 35 generates the reference voltage $e_0$. Adding amplifier 29 comprises an adding circuit similar to the amplifiers $37_{n-1}$–$37_1$ shown in FIG. 11 and amplifiers similar to the amplifiers $36_{n-1}$–$36_1$, arranged in such a manner that switching of the gains of the amplifiers referring to $k$ is separated to ($n$–1) amplifiers allocating the gains $1/G_1(r_2, r_1)$, $1/G_2(r_3, r_2) \ldots 1/G_{n-1}(r_n, r_{n-1})$, respectively. 38 is a control circuit for selectively controlling the gains of amplifiers in response to $m$-base $n$ digit coded signals from input terminal 30. This circuit is similar to that of FIG. 11 which generates the decoded signals at the output.

As described above, according to the nonlinear quantizing system of this invention, $m$ base $n$ digit coding can be obtained by way of selectively controlling the gains of amplifiers with the least number of elements. Moreover, according to the present invention, coding is made by a characteristic which is independent of the non-linear characteristic itself, therefore, a very stable characteristic can be obtained. This system can be applied not only to an analog-to-digital converter but also to a PCM signal transmission of audio, carrier telephony, video and telemeter signals or to a digital voltage meter of 0.1 db steps, setting $\alpha_1=0.1$ db, for instance.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A code converter for converting an analogue signal supplied from an input source into a digital signal, comprising:

(A) an input terminal connected to said input source;
(B) a digital output terminal;
(C) a selector circuit connected to said input terminal;
(D) a coding network connected between said selector circuit and said output terminal which includes:
  (1) discriminator means for producing a discriminator output signal that is indicative of whether the signal supplied from said selector circuit exceeds a preset value,
  (2) coding means connected to receive said discriminator output signal, and connected to said output terminal, for generating a digital signal indicative of whether said discriminator output signal exceeds said preset value,
  (3) means in said discriminator means for successively varying said preset value after each digit of said digital signal is generated.
  (4) switching means controlled by said coding means for switching among the discriminator output signal and said supplied selector signal;
(E) a feedback loop, including delay means, connected between said switch means and said selector circuit for feeding back the output from said switching means to said selector circuit, said selector circuit, selecting one of said feedback signal and said input analogue signal to be supplied as the input to said coding network, whereby said code converter will generate the digital signals on a time division basis.

2. A code converter for logarithmically converting an analogue input signal supplied from an input source into an $m$-ary digital signal having a predetermined number of $m$-ary digits, where $m$ is an integer, said converter comprising:

(A) an input terminal connected to said input source;
(B) a digital output terminal and a first output terminal;
(C) at least one coding network connected between said input terminal and said output terminals, each coding network including:
  (1) discriminator means connected to said input terminal, said discriminator means having:
    (a) level sensing means for generating discriminator signals indicative of which of $m$ different preset levels the input signals fall, said $m$ different levels being selected such that the ratio of each adjacent pair of levels is equal to a constant that is determined by the degree of logarithmic coding,
    (b) coding means connected to said digital output terminal and responsive to the discriminator signals generated by said level sensing means for generating digital signals which are indicative of which of said $m$ different levels were sensed, (2) a variable gain amplifier having at least $m$ different gains, connected to said discriminator means and said input terminal for variably amplifying, responsive to said level sensing means, at least that signal which is to be supplied to the first output terminal, with a predetermined one of said $m$ different gains, (3) switch means, responsive to said coding means and connected between said variable gain amplifier and said first output terminal for supplying one of said variable gain amplifier signals to said first output terminal.

3. A code converter as set forth in claim 2 wherein said variable gain amplifier means includes an amplifier for each of said $m$ discrete levels, said amplifiers having $m$ mutually different gains.

4. A code converter as set forth in claim 3 wherein $m$ preamplifiers are provided and connected in parallel between said input terminal and said discriminator means and wherein said discriminator means includes $m-1$ subtraction circuits, said subtraction circuits being respectively connected between $m-1$ of said preamplifiers and $m-1$ of said $m$ amplifiers in said variable amplifier means, a subtraction circuit subtracting said preset value from the preamplified analogue input signals supplied by said preamplifiers and wherein said coding means for producing said digital signals includes a polarity detector connected to each subtraction circuit for producing a digit of said $m$-ary code in response to the output of said subtraction circuits.

5. A code converter as set forth in claim 4 wherein $m$ is two and wherein only two amplifiers are provided in said variable amplifying means and wherein the gain of said preamplifiers is unity.

6. A code converter as set forth in claim 2 wherein said code converter includes at least two cascaded coding networks and wherein the output of the first network is connected as the input signal to the second network, the digital output signals supplied by said cascaded networks being produced on a space division basis.

7. A code converter as set forth in claim 2 wherein only one coding network is provided and wherein a selector circuit is connected between the input terminal and said network and wherein said network further comprises a feedback loop including delay means connected between said first output terminal and said selector circuit for feeding back the output of said network to said selector circuit, said selector circuit selecting one of said feedback signal and said input analogue signal to be supplied as the input to said network, and wherein means are provided in said discriminator means for subtracting a different preset value from the selector signal supplied thereto, after each digit is generated, whereby said digits are generated on a time division basis.

References Cited by the Examiner

UNITED STATES PATENTS

| | | | |
|---|---|---|---|
| 2,660,618 | 11/1953 | Aigrain | 340—347 |
| 2,950,348 | 8/1960 | Mayer | 340—347 |
| 3,119,105 | 1/1964 | Jepperson | 340—347 |

MAYNARD R. WILBUR, *Primary Examiner.*

MALCOLM A. MORRISON, L. W. MASSEY, W. J. KOPACZ, *Assistant Examiners.*